(No Model.) 2 Sheets—Sheet 1.

R. A. LISTER & M. PEDERSEN.
PUMP.

No. 451,827. Patented May 5, 1891.

Witnesses.
Arthur H. Abell.
Jona B. Cilley

Inventors
Robert Ashton Lister
and
Mikael Pedersen
By John J. Halsted & Son
their attys

THE NORRIS PETERS CO., PHOTO-LITHO., WASHINGTON, D. C.

(No Model.) 2 Sheets—Sheet 2.

R. A. LISTER & M. PEDERSEN.
PUMP.

No. 451,827. Patented May 5, 1891.

Witnesses.
Arthur H. Abell.
Jona' B. ...

Inventors,
Robert Ashton Lister
and
Mikael Pedersen.
By John J. Halsted & Son
their attys.

UNITED STATES PATENT OFFICE.

ROBERT ASHTON LISTER AND MIKAEL PEDERSEN, OF DURSLEY, ENGLAND.

PUMP.

SPECIFICATION forming part of Letters Patent No. 451,827, dated May 5, 1891.

Application filed July 30, 1890. Serial No. 360,367. (No model.)

*To all whom it may concern:*

Be it known that we, ROBERT ASHTON LISTER and MIKAEL PEDERSEN, subjects of the Queen of Great Britain, residing at Dursley, England, have invented new and useful Improvements in Pumps for Milk and other Fluids, of which the following is a specification.

Our invention relates to centrifugal pumps especially designed for pumping milk, but also applicable for pumping other fluids.

Figure 1:
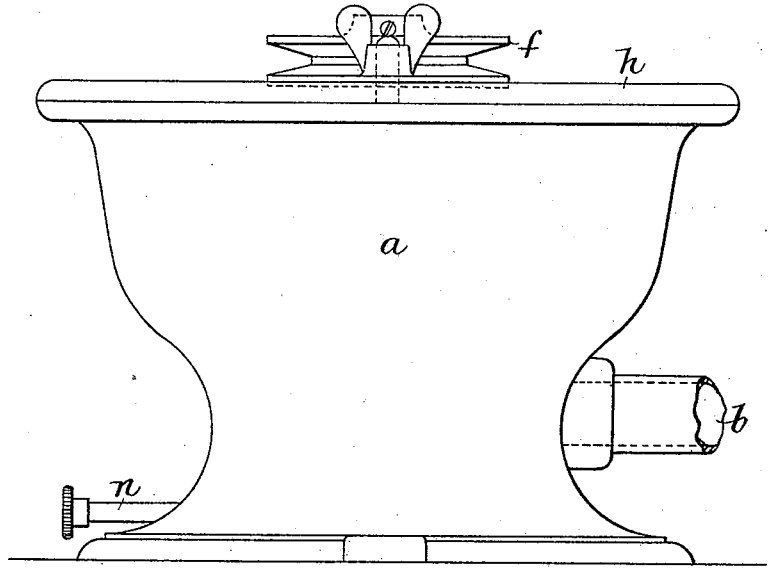
Figure 2:
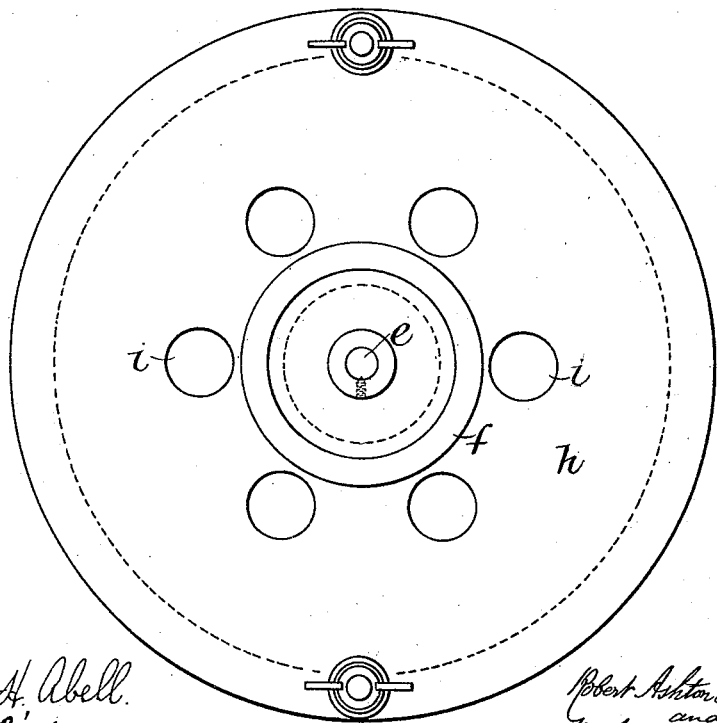
Figure 3:
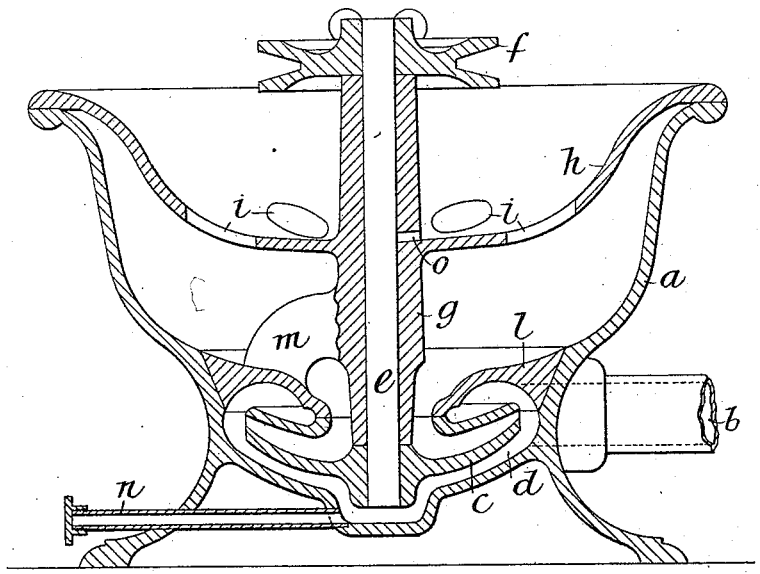
Figure 4:
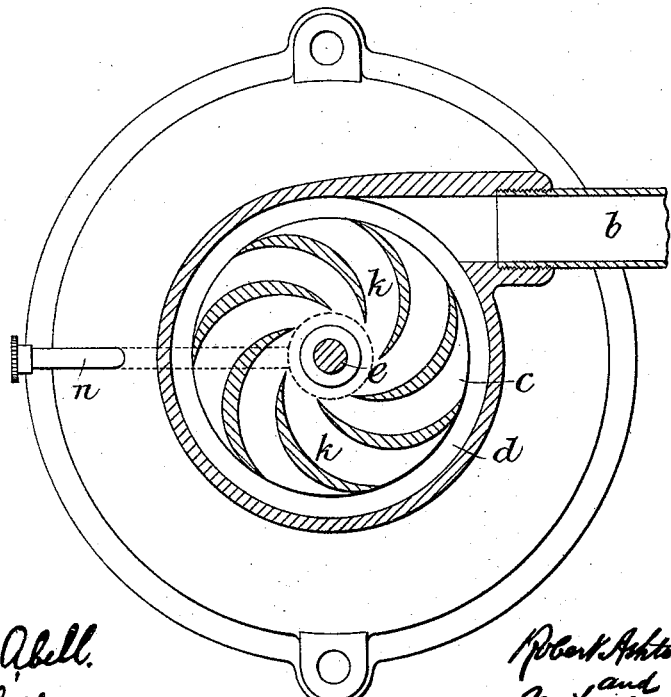

In the accompanying drawings, Figure 1 is an elevation of a pump provided with our improvements. Fig. 2 is a plan of the same. Fig. 3 is a vertical section, and Fig. 4 is a horizontal section.

According to our invention we provide a vessel or chamber $a$, into which the milk or other fluid to be pumped is poured, and from which it is forced through a pipe $b$ by means of a concave disk $c$, working in a recess $d$ in the bottom of the vessel $a$. The disk $c$ is secured to one end of a shaft $e$, to the other end of which is connected a driving-pulley $f$, the said shaft being carried in a bearing or boss $g$ at the center of a dished plate $h$, forming a cover for the vessel $a$ and being supported on the edges thereof, all as shown in Fig. 3. Holes $i\ i$, into which strainers may be introduced, are formed in the dished plate to allow the milk or other fluid to flow into the vessel $a$. The said disk is formed with a series of curved passages $k\ k$, extending from the center to the periphery, as shown in Fig. 4, and in order to direct the liquid into the said passages at the center of the disk we provide a ring or shield $l$, which fits into a seat in the vessel $a$ and incloses an annular space in which the disk rotates. The ring is connected to the bearing $g$ by a series of arms $m$, so that when the dished plate is lifted the ring $l$ will also be lifted.

With the construction hereinbefore described it is obvious that when milk or other liquid is poured into the apparatus and the disk caused to rotate it will flow into the passages $k\ k$, and, owing to the rotation of the disk, forcibly issue from the said passages and be caused to travel along the outlet $b$. A tube $n$ is connected to the vessel $a$ at the lowest part to draw off any liquid in the bottom thereof. A hole $o$ is formed in the bearing $g$ to allow the fluid to reach the shaft $e$, and so effect the lubrication thereof.

Some of the advantages of our invention are that no air-tight joint is required, that as the shaft is suspended in its bearing no packing is required, and that the shaft is self-lubricating.

Having now particularly described and ascertained the nature of our said invention and in what manner the same is to be performed, we declare that what we claim is—

1. In a centrifugal pump, the combination, with a receiving-vessel, of a dished cover carrying at its center a spindle, at the lower end of which the pump-disk is fixed, the said disk being located in a recess in the said receiving-vessel and covered by a ring, substantially as described.

2. In a centrifugal pump, a vertical shaft carrying at its lower end a horizontal pump-disk $c$, of a concave shape, having a series of passages through it, as described, combined with a receiving-vessel above said disk and a liquid-holding cover above said vessel, suitable passages for the liquid being provided, leading down from the cover to the vessel and from the vessel to the disk, all substantially as set forth.

ROBERT ASHTON LISTER.
MIKAEL PEDERSEN.

Witnesses:
   WM. JOS. ASHWORTH,
     *Parsonage Street, Dursley.*
   B. S. HILL,
     *The Quarry, Dursley.*